United States Patent

Hofmann et al.

[11] Patent Number: 5,911,459
[45] Date of Patent: Jun. 15, 1999

[54] METHOD OF INSTALLING AN ANTIFRICTION BEARING RING IN A HOUSING

[75] Inventors: Heinrich Hofmann, Schweinfurt; Roland Langer, Schwanfeld; Bernard Wilm, Nüdlingen, all of Germany

[73] Assignee: FAG Automobiltechnik AG, Germany

[21] Appl. No.: 08/804,890

[22] Filed: Feb. 24, 1997

[30] Foreign Application Priority Data

Feb. 24, 1996 [DE] Germany .................. 196 07 024

[51] Int. Cl.$^6$ ................................. B23P 15/00
[52] U.S. Cl. ............................ 29/898.07; 29/525
[58] Field of Search ................ 29/898, 898.051, 29/898.07, 898.062, 898.064, 465, 525; 72/115, 67

[56] References Cited

U.S. PATENT DOCUMENTS 2,779,641  1/1957  Sutowski .
5,615,569  4/1997  Schlatter .

FOREIGN PATENT DOCUMENTS 0369789   5/1990   European Pat. Off. .
0383578   8/1990   European Pat. Off. .
0516222  12/1992   European Pat. Off. .
2611580   9/1977   Germany .

OTHER PUBLICATIONS

DE–Z. "antriebstechnik" 20 (1981) Nr. 12, S. 554–558.
DE–Broschüre, SKF, "Einbau von Wälzlagern" Bd. 4893 (3939) 6 66 Reg. 761, Seite 7.

*Primary Examiner*—Carl E. Hall
*Attorney, Agent, or Firm*—Ostrolenk, Faber, Gerb & Soffen, LLP

[57] ABSTRACT

A method for installing the ring of an antifriction bearing in a bore of a housing or hub, wherein the ring is of a size that would interfere with the housing and prevent installation. The installation is done using a lengthwise force fit process without affecting the temperature of either the ring or housing at the bore by an inclined header rotating around the axis of the bore to apply an orbital, wobble, rolling movement to the ring and to press the ring into the bore. The interference of the bearing ring with the bore corresponds to tolerance fields set forth in DIN 7155.

6 Claims, 4 Drawing Sheets

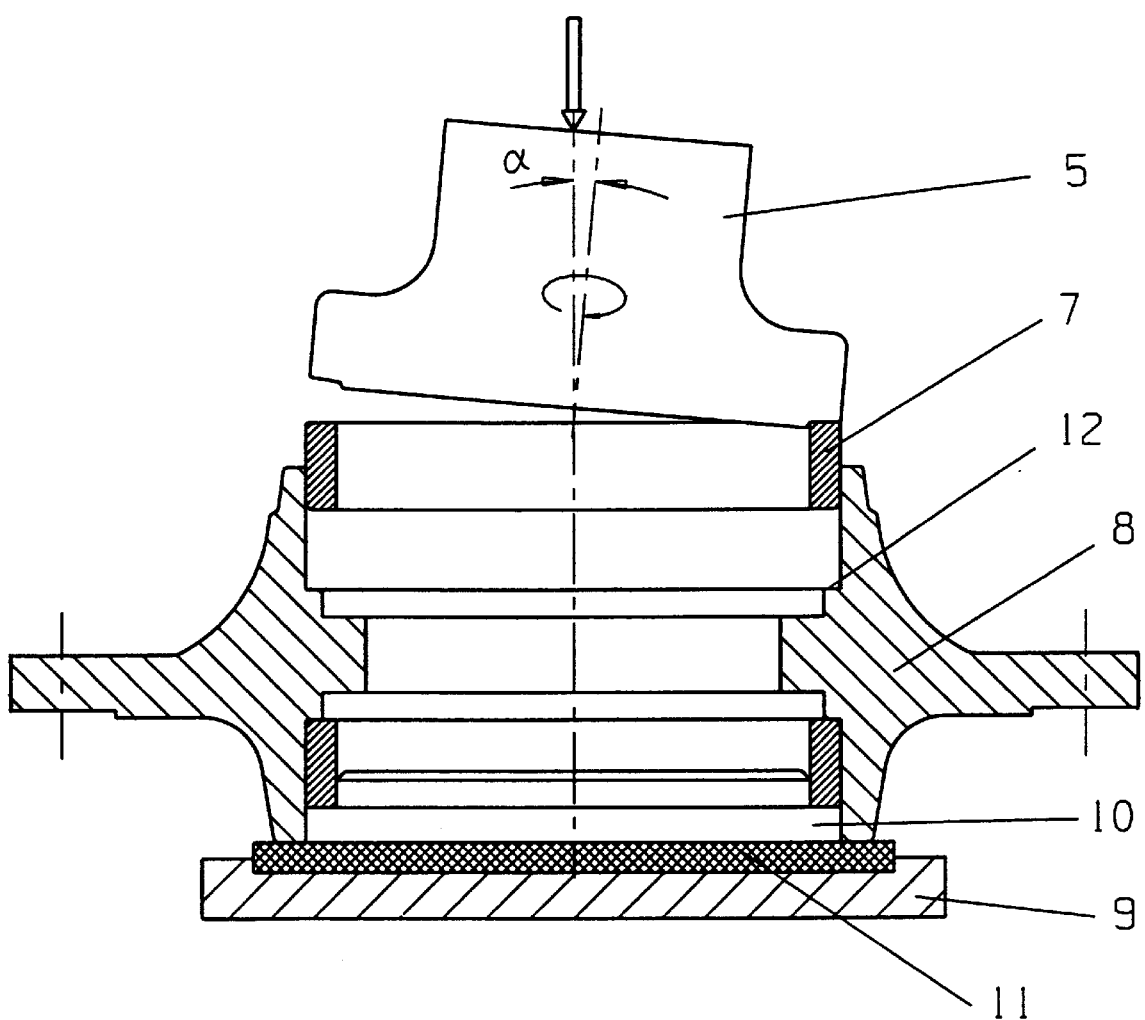

THE HOUSING IS HEATED

METHOD OF INSTALLING AN ANTIFRICTION BEARING RING IN A HOUSING

BACKGROUND OF THE INVENTION

The present invention relates to a method for pressing in an antifriction bearing ring with high interference into a housing which receives the ring.

When higher forces are to be transmitted in antifriction bearings while additional axial fastening of the outer ring of the bearing is to be dispensed with in order to save costs, high force fits are required between the ring of the bearing and the object, e.g., a housing or a hub in which the ring is installed. As a result, high pressing in forces are also required for installing the ring. This requires using powerful and therefore expensive presses. On the other hand, the high pressing in forces lead to cold welding, hub cracking, etc.

Heating of the housing which is to receive the ring to temporarily expand the housing or deep cooling of the ring for temporarily contracting it in order to temporarily overcome high interference during installation of the ring is not possible during mass production of wheel bearings, since those steps are too costly and expensive. This is also true of hydraulic mounting methods in which oil is applied under high pressure into the force fit space and the ring or housing is thus widened. Details, calculation and shaping of force fits are described in general literature (see, for example, G. Niemann "Maschinenelemente" [Machine Elements], Vol. 1, pages 359 et seq., second edition, published in 1975 by Springer Verlag (Berlin-Heidelberg-New York) or "Zylinderpress-verband", Research Issue 161 of the Forschungsvereinigung Antriebstechnik e.V. 1984. Especially for antifriction bearings, suggestions for installation are given in "Die Wälzlagerpraxis" [Antifriction Bearing Practice] by Brändlein, Eschmann, Hasbargen, Weigand, 1995, Vereinigte Fachverlage GmbH, Mainz, page 398 et seq. or W. Hampp "Wälzlagerungen" [Antifriction Bearings] 1968, Springer Verlag, pages 132 et seq. They disclose that with correspondingly high interference between the ring and the housing or hub in which it is installed, a shift must soon be made to thermal technology or to hydraulic mounting methods.

SUMMARY OF THE INVENTION

The object of the invention is to provide a method for pressing in an antifriction bearing ring into a housing which permits high interference between the ring and the housing or hub in which the ring is installed, which method is favorable from a cost standpoint, and which avoids damage to the bearing ring or the housing/hub. The antifriction bearing ring is pressed into a steel, cast iron or aluminum housing which permits high interference. The fastening is done by an ambient temperature or cold, longitudinal force fit. The interference of the antifriction bearing ring corresponds at least to the tolerance field greater than or equal to T (in the case of the shaft-basis system of fits, tolerance field h; see DIN 7155). The ring is pressed in at ambient room temperature i.e. the housing at its bore and the ring are at generally the same temperature, and the ring is pressed in with a continuous rolling, wobble or orbital movement.

Although use of an adaptor plate with means for wobble pressing for an axial press is known from EP 516 222 A2, that disclosed apparatus is suitable primarily for compacting sintered moldings. Using it for pressing in antifriction bearing rings is not obvious since, in the case of wobbling movement, canting of the ring in the cylindrical bore would have been expected.

Using a wobble or orbital press instead of an axial press provides a pressing force which is locally high but is slight as a whole, resulting in gentle handling of all parts. With several revolutions of the roll spindle, the segmented rolling force finally presses the outer ring uniformly centrally into the bore of the housing or of a hub. In an experiment, it was surprisingly found that, despite a high overlap (the bore is e.g. 262 $\mu$m narrower than the bearing ring outside diameter of D=175 mm), no substantial removal of material of the housing inside the bore takes place. (As the installed ring is hardened, material would be removed only from the bore.) Thus, even tolerance fields in the overlap region x or z of DIN 7155 are possible.

Pressing in the roll with an obliquely inclined rotating header axis causes a continuous rotating local widening of the housing, which is local where pressure is at that moment being applied, so that, as a result of the hydraulic axial advance, the ring is introduced in a screw like manner into the seating place in the bore. Surprisingly, no stick-slip effect occurs, i.e., the coefficient of sliding function is retained upon the roll pressing. In contrast to cylindrical methods of pressing in, no damage to the surface is noted. However, canting of the ring, which one might fear would occur, surprisingly also does not occur.

Other features and advantages of the present invention will become apparent from the following description of the invention which refers to the accompanying drawings.

BRIEF DESCRIPTION OF THE DRAWINGS

FIG. 2 shows the process of pressing in of a bearing outer ring into a housing on a larger scale;

DETAILED DESCRIPTION OF A PREFERRED EMBODIMENT

Figure 1:
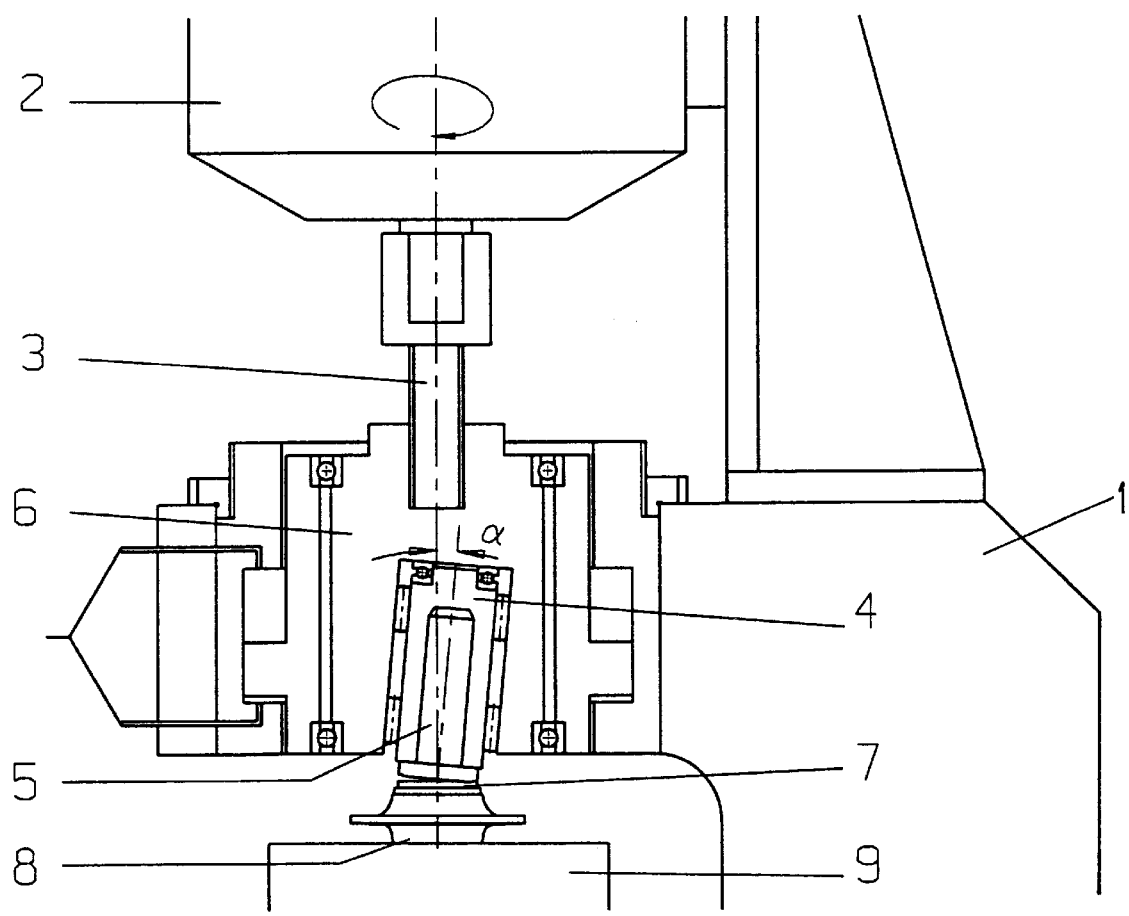
FIG. 1 diagrammatically shows the construction of a pressing in device which is used for installing an antifriction bearing in a housing according to the invention.

In FIG. 1, the press housing 1 supports a drive head 2 which is rotated by a drive shaft 3 of a header holder 4. The header 5 arranged in the header holder 4 is inclined at an angle $\alpha$ to the axis of the drive shaft so that the header acts as an orbital, rolling or wobble element as its peripheral region rotates around and in contact with the ring. A hydraulic feed device 6 provides the pressing in movement and force which moves the header 5 toward the outer ring 7 and presses the ring 7 into the housing 8 as the header rotates.

FIG. 2 shows a centering plate 10 between the press table 9 and the housing 8. That plate assures that the axis of the housing is aligned with the axis of the drive shaft. To avoid deformation of the housing, e.g., an aluminum housing 8 (although cast iron or steel may be used), an elastic material intermediate plate 11 is provided. Under the influence of the orbiting feed movement and force supplied by the header 5, the outer ring 7 is pressed with a rolling movement with high interference into the housing 8, downward in FIG. 2, until the fully installed ring 7 rests against the housing collar 12. Surprisingly, neither a stick-slip effect nor a canting of the ring takes place during this process. It is believed that pressing in with an obliquely inclined rotating header axis causes a continuously rotating local widening of the housing 8 so that the hydraulic axial feed introduces the ring 7 in screw like manner into the seat. In contrast to a cylindrical pressing in method, no damage is caused to the surface of the housing 8.

Figure 3A:
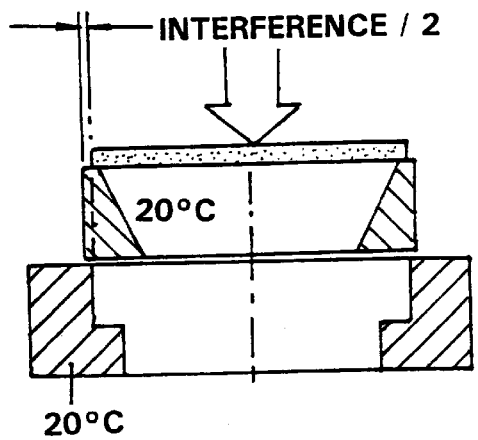
FIG. 3a and FIG. 3b show conventional installation techniques which are on the graph of FIG. 3 as well.
Figure 3B:
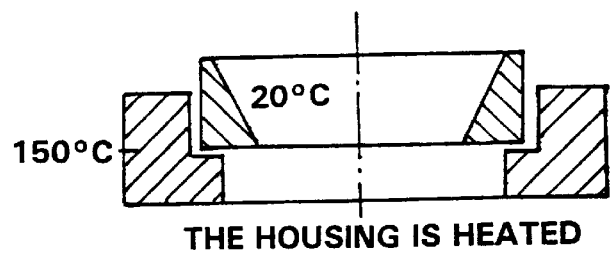
Figure 3:
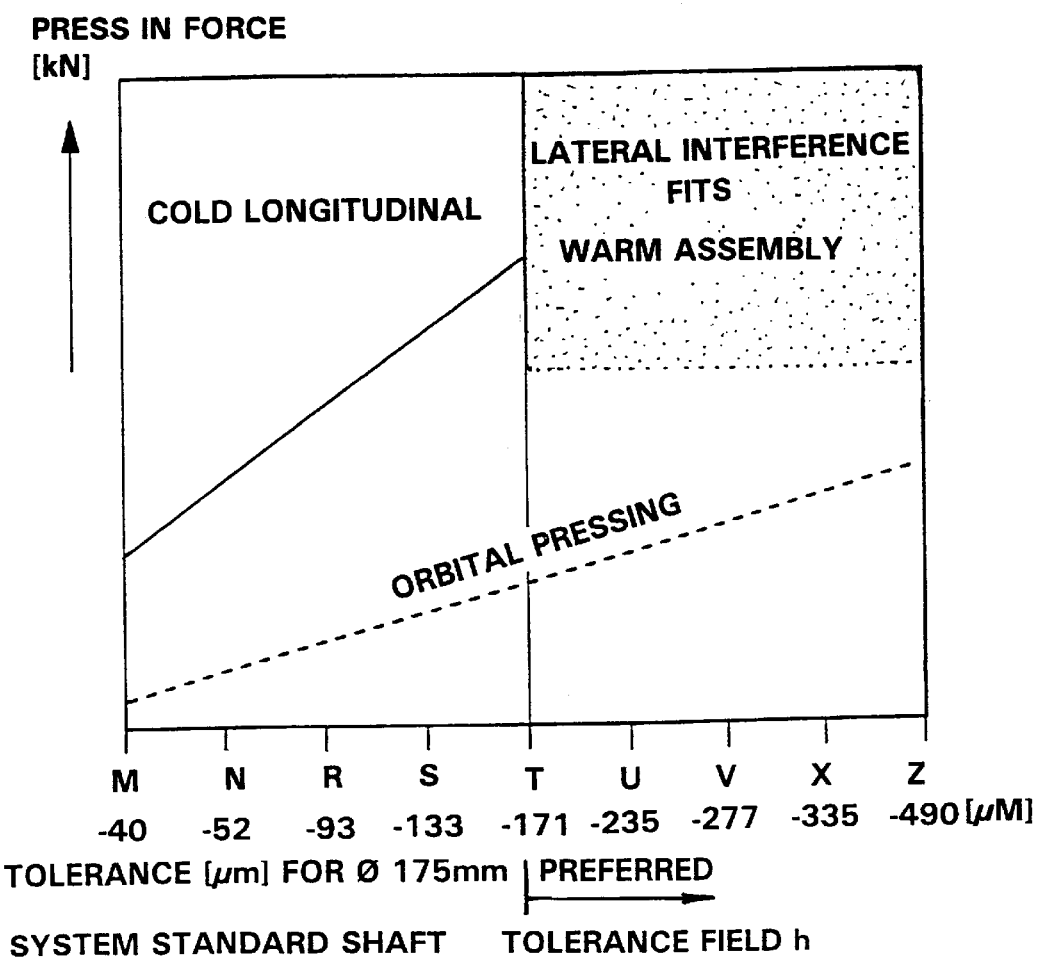
FIG. 3 is a schematic graph of the pressing in force over interference of the tolerance ranges in accordance with DIN 7155 and graphing the curve applicable to the present invention.

FIG. 3 graphs the variation of the pressing force over the tolerance field. The force required for pressing in the ring according to the orbital pressing method of the invention, which is shown in dashed line, is substantially less than the force required for cylindrical, non-orbiting pressing, which is shown in solid line. The region from tolerance fields T to Z shown with darker background had previously been covered only by hot mounting or pressurized oil methods.

Because of the elevated force required for cylindrically pressing in the bearing ring, as shown by the solid line, at higher tolerance levels, the ring can be installed only through an additional step like heating the housing or hub to temporarily enlarge its bore opening. But with the method of the invention, the ring becomes inserted even at higher tolerance levels without having to heat the holder or chill the ring or take other measures to temporarily enlarge the opening in the holder to receive the ring.

FIGS. 3, 3a and 3b actually show three assembly procedures. Each insertion force is represented by the excess dictated by the tolerance fields (M–Z). The left-hand side of FIG. 3 (M–T) shows conventional room-temperature procedures in accordance with the methods represented at FIG. 3a. The narrower the bore (e.g. 40 to 171 narrower than the ring), the more force is needed to insert the ring. The conventional method of FIG. 3a cannot be employed above range T because it leads to seizing and welding.

At that point it becomes necessary to resort to the hot assembly represented by the area at the top right in FIG. 3 and by FIG. 3b. No particular force is needed for installation of the ring by this process, of course, so there is no curve representing it in FIG. 3. Hot assembly also allows excesses in the T–Z range (–171 to –490 μm). The bore in the housing/hub can accordingly be considerably smaller than the outside of the ring. This has to do with the permissible level of heating.

The roller-insertion procedure in accordance with the present invention ("orbital pressing") can be carried out with essentially less force, as represented by the broken line at room temperature, not only in the conventional range (M–T) but also in the range (T–Z) which was previously possible only by subjecting the housing to heat, and can be carried out without seizing in the bore.

Using the method of the invention, with an outer ring diameter of 175 mm and an excess of 262 μm, after the pressing in, a hot removal was effected and it was found that only 10 μm smoothing of the unhardened bore of the housing had taken place. A smooth surface was present in the housing seat and no cold welding could be noted.

Figure 4:
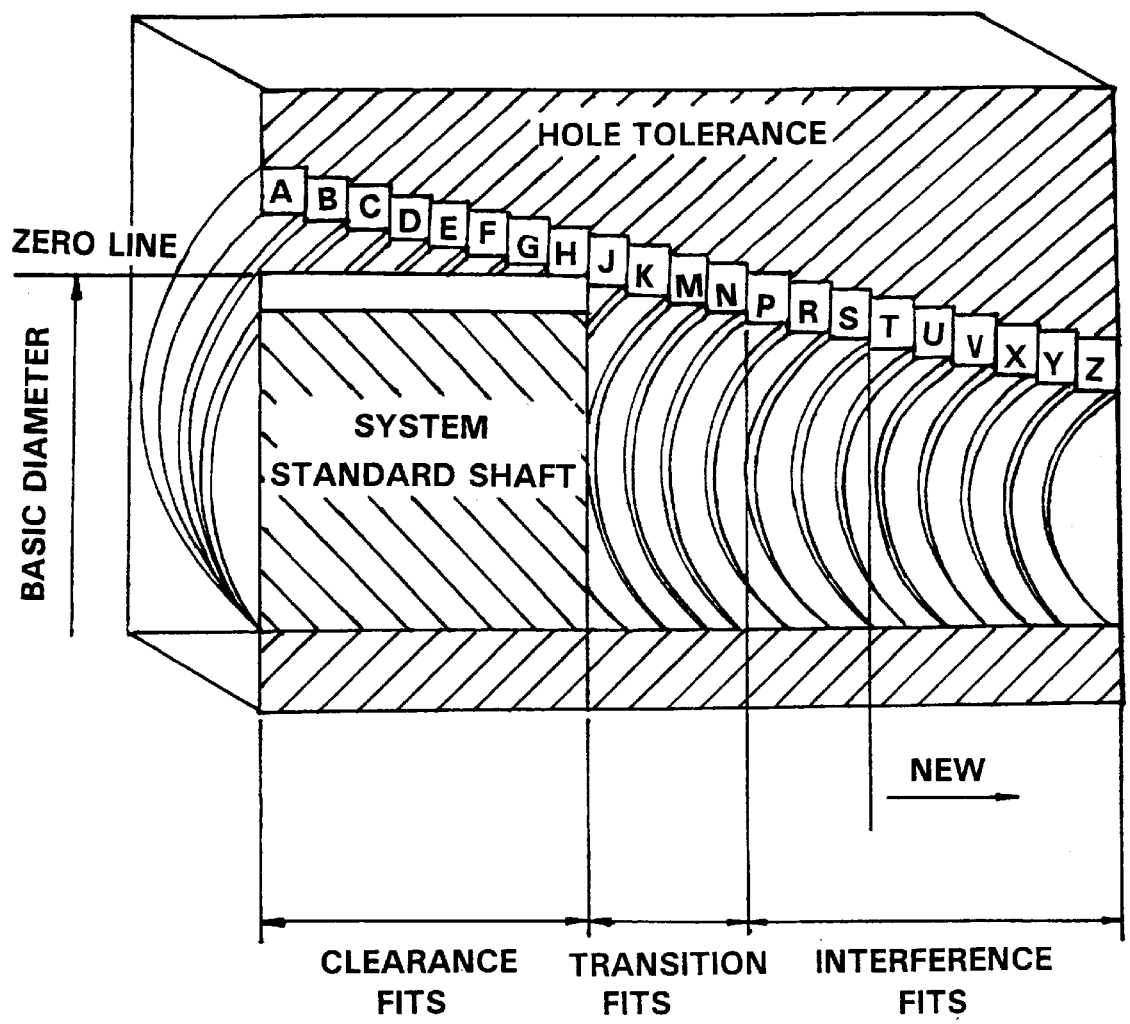
FIG. 4 shows the DIN 7155 for explaining the preferred embodiment.

For explanation of a term used herein and the elements graphed herein, FIG. 4 illustrates the DIN 7155 standard-shaft system. The point of departure is a shaft (outer bearing ring) with a specific diameter, 175 mm for instance. The tolerance field h means that this diameter can vary from 0 to –25 μm. The diameter can accordingly be 175.000 to 174.975 mm. The diameter of the bore can also vary within specific limits. Tolerance fields A through Z determine whether the bore is wider (A–H) or narrower (P–Z) than the shaft. There is a transition at J–N.

One example would be a bore with a nominal diameter of 175 mm in tolerance field A (+830 to +580 μm), which would be permitted in reality to range from 175.830 to 175.580, meaning that the fit would involve "clearance". The same bore in tolerance field R (–53 to –93 μm) on the other hand would have permissible dimensions of 174.947 to 174.917 mm. The shaft (outer bearing ring) would accordingly have to be forced into the bore, an "interference" fit. In tolerance field T (–130 to –171) the permissible tolerances of the bore would be 174.070 to 174.029 mm.

The same numbers are represented in FIG. 3, wherein the appropriate letters (M through Z) are entered above the numbers (–40 to –190).

Although the present invention has been described in relation to a particular embodiment thereof, many other variations and modifications and other uses will become apparent to those skilled in the art. It is preferred, therefore, that the present invention be limited not by the specific disclosure herein, but only by the appended claims.

What is claimed is:

1. A method of installing a ring of an antifriction bearing in a bore of a housing for the bearing, wherein the ring and housing, when generally unheated, are sized such that interference exists between the bearing ring and the bore, the method comprising:

installing the ring by a press fit installation generally in the direction of the axis of the bore and the axis of the ring; and pressing the ring into the bore by a continuous rolling, wobble, orbital movement while pressing the ring generally in the direction of its axis and into the bore.

2. A method of claim 1, wherein ring is installed in the bore of the housing without additionally elevating the temperature of the housing at the bore or cooling the temperature of the ring being installed.

3. The method of claim 2, wherein the ring is installed in the housing at ambient temperatures.

4. The method of claim 1, wherein the pressing in is effected by rotating an obliquely inclined header, which is an engagement with the ring, around the ring while the header presses upon the ring to press the ring into the housing bore.

5. The method of claim 4, further comprising hydraulically pressing the header to press the ring into the bore while rotating the header.

6. The method of claim 1, wherein the ring being fitted into the bore is sized with respect to the bore so that at ambient temperature for both the ring and the hub, the interference of the ring corresponds at least to the tolerance field that is greater than or equal to T in the shift-basis system of fits, tolerance field h DIN 7155.

* * * * *